May 28, 1935.   W. ACKERMAN   2,002,516
TAPE PERFORATING MACHINE
Filed March 22, 1929   10 Sheets-Sheet 1

INVENTOR
William Ackerman
BY
Thomson Kennedy Campbell
ATTORNEYS

May 28, 1935. W. ACKERMAN 2,002,516
TAPE PERFORATING MACHINE
Filed March 22, 1929 10 Sheets-Sheet 3

May 28, 1935.  W. ACKERMAN  2,002,516
TAPE PERFORATING MACHINE
Filed March 22, 1929   10 Sheets-Sheet 4

INVENTOR
William Ackerman
BY
Morrison Kennedy Campbell
ATTORNEYS

May 28, 1935. W. ACKERMAN 2,002,516
TAPE PERFORATING MACHINE
Filed March 22, 1929    10 Sheets-Sheet 5

INVENTOR
William Ackerman
BY
Morrison, Kennedy
Campbell ATTORNEYS

May 28, 1935.  W. ACKERMAN  2,002,516
TAPE PERFORATING MACHINE
Filed March 22, 1929   10 Sheets-Sheet 8

INVENTOR
William Ackerman
BY
ATTORNEY

May 28, 1935.   W. ACKERMAN   2,002,516
TAPE PERFORATING MACHINE
Filed March 22, 1929   10 Sheets-Sheet 9

Fig. 19.

INVENTOR
William Ackerman
BY
Thomson Kennedy & Campbell
ATTORNEYS

Patented May 28, 1935

2,002,516

UNITED STATES PATENT OFFICE 2,002,516

TAPE PERFORATING MACHINE

William Ackerman, Towners, N. Y., assignor to Mergenthaler Linotype Company, a corporation of New York Application March 22, 1929, Serial No. 349,240

2 Claims. (Cl. 164—113)

This invention is directed to an improved machine for producing perforated tapes adapted to control the release of matrices and spacers of typographical composing machines, such as linotype machines of the general organization represented in U. S. Letters Patent to O. Mergenthaler No. 436,532. In these latter machines, the matrices and spacers, after being released from their respective magazines by the operation of power-actuated escapement devices, are composed in line and then presented to the justifying and casting devices for the production of a slug or linotype bearing on its edge a justified line of printing characters. When the machines are operated by a perforated tape, the symbols produced in the tape automatically control the operation of the power-actuated escapement devices, each symbol representing a particular matrix or spacer which is to be released in composing a line, and the symbols being disposed in groups or rows representative of the successive lines to be composed or the printing slugs to be cast therefrom. As is well understood, the number of symbols in each group or row must correspond to the number of matrices and spacers to be set up in the line represented by that particular group, and herein lies one of the main difficulties in attempting to control the operation of a linotype machine by a perforated tape, it being obvious that the actual number of matrices and spacers which can be composed in a line of a given length will depend upon the size or thickness of the matrices comprising the particular font in use. Bearing in mind the great number of different sizes of matrix fonts employed in linotype machines as well as the wide variation prevailing between the individual matrices comprising each font, it is obvious that the number of symbols which should be produced in the tape to compose a given-length line of matrices of a particular font is difficult of ascertainment.

In an attempt to solve this problem, it has been proposed to associate with the perforating apparatus, for the guidance of the keyboard operator, a counting mechanism which will register and indicate the number of units represented by the matrices to be released by the symbols produced, but the great number of units which must be reckoned with in the case of linotype matrices (well above forty-five), as well as the necessity for variations in adjustment to accord with the numerous matrix fonts employed, lead into so many complications as to render the counting mechanism altogether impractical and unreliable. While successful counting mechanisms have been employed in connection with perforators used for the production of perforated tapes to control the operation of typewriters and type-casting machines, it must be remembered that the number of units required for these machines is comparatively small, eighteen being about the maximum for type-casting machines and a much less number for typewriters. Other attempts have been made to solve the problem, but so far as applicant is aware none has proved to be entirely satisfactory.

The present invention is intended to overcome the foregoing and other difficulties and contemplates a simple and thoroughly reliable scheme by which the operator may determine with accuracy the exact number of symbols which should be made in the perforated tape to compose a justifiable line of matrices and spacers of any given length in the case of any selected matrix font, so that when the perforated tape is run through a linotype machine it can be relied upon to produce a justified line of type corresponding to the characters represented by the symbols produced in the tape by the perforating machine.

In carrying out the invention, it is proposed to combine with the tape perforating unit, a composing unit which is equipped with a set of (what will be termed for the want of a better name) "indicators" varying in thickness to correspond to the matrices and spacers of the linotype machine which is to be operated by the perforated tape, and to control the operation of both the perforating and composing units from a common keyboard in such manner that, as each symbol is produced in the tape by the actuation of a finger key, there will be simultaneously set up in line an indicator corresponding in thickness to the matrix or spacer represented by said symbol, whereby the number of indicators thus composed in line will determine the number of symbols produced in the tape, it being understood of course that the length of the line of indicators is fixed in advance by the proper adjustment of the composing mechanism, just as must be done in composing a line of matrices in a linotype machine.

In practice, the indicators will preferably be made of the same identical thickness as the matrices they are intended to represent, altho it is obvious that, if desired, they could be made thicker or thinner, so long as some definite proportion were maintained to the actual thickness of the matrices. The expression "corresponding in thickness" is therefore intended to mean identity of thickness or some definite relation in thickness between the indicators and the matrices.

As regards the spacers, these take different forms in linotype machines, some being expansible and known as spacebands, and others being solid or non-expansible and known as blanks, quads, or spaces. The indicators used to represent these different spacers will likewise correspond in thickness to them, altho it may be stated here that the thickness of the indicator for an expansible spacer or spaceband will correspond to the thickness of such spaceband in its unexpanded condition, that is to say, as the spaceband is composed in line and before it is expanded to justify the line.

There will thus be as many different thicknesses of indicators employed in the composing unit as there are different thicknesses of matrices and spacers employed in the linotype machine which is to be controlled by the perforated tape. In fact, while special blanks or "dummy matrices" would answer the purpose equally as well, it is intended to make use of the regular linotype matrices and spacers as indicators in the composing unit, except as regards the expansible spacebands for which special blank matrices will be used to facilitate handling. By doing this, any of the outstanding matrix fonts may be employed in the composing unit, and no extra expense need be incurred in reproducing these various fonts in dummy form. Eventually, however, it may be found to be more advantageous to make the indicators in special or dummy form, and this should be understood as comprised within the invention.

From what has been said above in regard to the thickness of the indicators, it may have been gathered that the invention also contemplates the use of as many different sets of indicators as there are matrix fonts to be employed in the linotype machine to be governed by the perforated tape. In other words, when the perforator is intended to produce symbols in the tape to control the release of matrices, say, of a 6 pt. font, the composing unit will be equipped with a set of indicators of corresponding thickness, that is to say, of 6 pt. size. Since it is the intention to make use of the regular linotype matrices as indicators, this simply means that the composing unit will be provided with a 6 pt. matrix font which is a duplicate of the font to be employed in the linotype machine when operated by the tape. On the other hand, if the symbols are to control the release of matrices, say, of a 12 pt. font, then the indicators or matrices used as such should be of 12 pt. size to correspond.

The solid or non-expansible spacers generally form part of a matrix font, so that a change of font will automatically take care of a change of these spacers, altho they seldom vary in thickness as between different fonts. The expansible spacers or spacebands likewise seldom vary in thickness, so that a change of indicators for them would not always be necessary. As a matter of convenience, however, all the indicators will be placed in the same magazine, and consequently a change of magazine is all that will be required to adapt the composing unit to any selected matrix font.

The composing unit as a whole, except as regards its operation by the perforator keyboard, is modeled along the lines of a linotype machine; in fact, it may actually be a complete linotype machine in itself, and in that case the matrices will not only serve as indicators in the perforation of the tape but, in addition, they may be used for the casting of slugs from which a proof may be printed, if desired. However, in order to simplify the construction and operation of the composing unit and to reduce the cost of manufacture to a minimum, it is made up merely to enable the indicators to be circulated through the machine in order that they may be composed in line and then returned immediately to their places of storage for use over and over again.

To this end, the indicators are stored in columns in a channeled magazine (there being at least as many columns as there are different thicknesses of indicators), and they are released from the magazine by escapement devices operated by power-driven cam yokes under the control of the finger keys which govern the operation of the perforators. As they are released from the magazine, the indicators pass onto an assembling belt which delivers them one at a time into an assembling elevator, wherein they are stacked side by side by a rapidly rotating star wheel, which advances them to the left against the opposition of a spring-operated line resistant set to determine the ultimate length of the composed line. After the line is composed, the assembler elevator is lifted and the line transferred therefrom directly onto a distributing elevator, which carries the line upwardly and delivers it into a distributor box from which the indicators are fed one by one into a distributor which returns them to the particular magazine channels from which they started. As will now be seen, the indicators are handled in practically the same way as the matrices of a linotype machine, except that they (the indicators) are in the present instance transferred directly from the assembling elevator to the distributing elevator, thereby enabling them to complete their circuit through the machine much more rapidly than do the matrices of a linotype machine. Besides, the absence of justifying and casting devices, etc., greatly simplifies the machine and reduces the parts to a minimum.

Perhaps a clearer understanding of the invention may be had by assuming, as may actually be the case, that the composing unit referred to is a complete linotype machine in itself. Obviously in such a case, the operator proceeds to set up a line of matrices and spacers just as if there were no perforating apparatus attached, and having completed the line, sends it on its way to the casting mechanism and proceeds with the composition of the next line. As the successive lines are composed, however, the keyboard, due to its joint control of the perforating apparatus, produces in the tape for each composed line a series of symbols representative of that line, both as regards the character and number of the matrices and spacers, so that when the perforated tape is later run through a similar linotype machine equipped with the same matrices and spacers and under the same adjustments, it will necessarily reproduce the lines as originally composed by the operator. This is precisely what the present scheme is intended to accomplish, because in that way the operator will produce in the tape the exact number of symbols required to represent a line of any given length and as constituted by matrices of any selected font.

More generally speaking, therefore, this invention presents a combined perforating and composing machine made up essentially of three distinct units, viz., a perforating mechanism, a composing mechanism, and a single keyboard for operating both of said mechanisms simultaneously. In specific detail, these different units may be of any well known or approved construction so long as they are combined in such manner that the composing operations take place simultaneously with the perforating operations. It will be understood that, whatever combination or code system is employed in perforating the tape, it should be followed in operating a linotype machine by the tape, in order that the symbols produced in the tape will be effective to control the release of the corresponding matrices when the tape is run through the machine. The code system given herein is substantially the same as that employed in the so-called "Teletypesetter" machine of recent development, so that no further elaboration seems necessary.

While the present invention is intended primarily to produce a tape adapted to control the operation of a linotype machine, it should be understood that the tape might be used as well to control the operation of some other kind of composing machine, such for example as a machine which handles type or dies or other typographical elements used for printing purposes. The reference in the appended claims, therefore, to matrices and spacers is to be understood as referring to such other typographical elements rather than alone to linotype matrices and spacers.

While, also, the invention is herein shown and described as applied to an actual perforating unit, it should be understood that any other form of tape marking apparatus might be employed instead, and the reference in the appended claims to a tape perforating apparatus and a perforated tape is intended to comprehend any form of tape marking apparatus and any kind of tape whose symbols are capable of controlling the release of the selected typographical elements.

Referring to the drawings.

The improved machine comprises three essential elements, namely, a tape perforating unit A, a composing unit B, and a keyboard C, which elements may be modified as desired so long as they are made to cooperate in the manner herein set forth.

Figure 15:
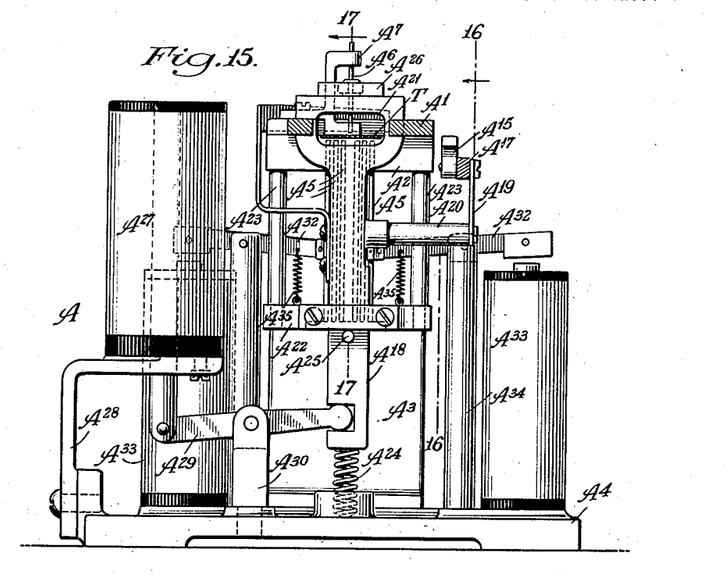
Fig. 15 is a vertical section, on an enlarged scale, taken on the line 15—15 of Fig. 8.
Figures 16, 17, 18:
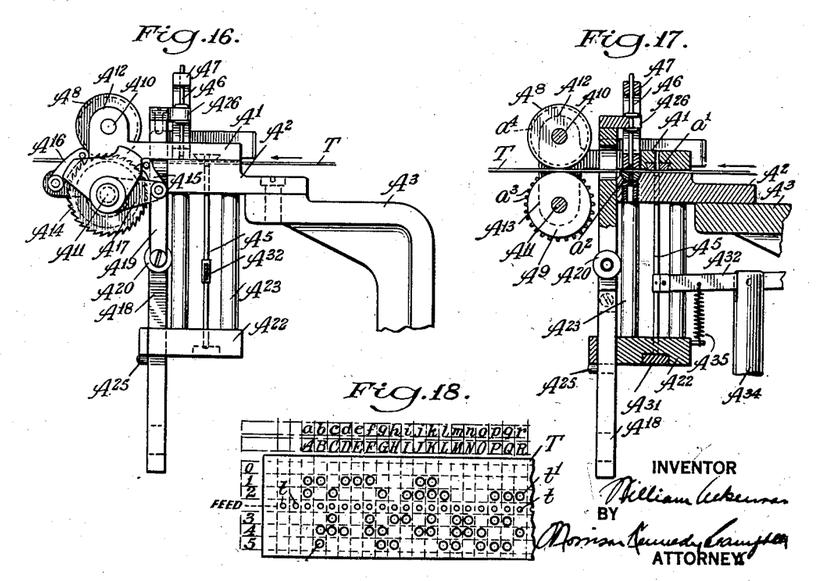
Fig. 16 is a vertical section taken on the line 16—16 of Fig. 15, looking in the direction of the arrows.
Fig. 17 is a section taken on the line 17—17 of Fig. 15, looking in the direction of the arrows.
Fig. 18 is a plan view of a portion of a tape produced by the machine, the characters represented by the symbols being indicated at the top.

The tape T, which may be carried in a roll T¹ located conveniently upon the keyboard frame (Fig. 1), enters the perforating unit A at the right, where it is guided and sustained between upper and lower guide plates A¹, A². These guide plates (Fig. 17) are mounted upon a stand-bracket A³, rising from one side of a base plate A⁴, and are provided respectively with punch dies $a^1$, $a^2$. The die $a^1$ is countersunk in the lower face of the upper plate A¹ directly above a row of six vertically movable punch rods A⁵, arranged at right angles to the direction in which the tape travels, and the die $a^2$ is countersunk in the upper face of the lower plate A² directly below a single overhead punch rod A⁶ located centrally above the tape. This particular punch rod A⁶ is mounted and guided in a small angular bracket A⁷ fastened to the top plate A¹ and is intended to produce in the tape a line of feed perforations $t$ (see Fig. 18), whereby the tape may be fed positively and in the required manner through the perforating mechanism A. The punch rods A⁵, as will be noted from Fig. 15, are divided into two separate groups of three each in order to clear the perforations $t$ when the rods are thrust upwardly through the tape.

The advance of the tape T is effected by means of a pair of feed rollers $A^8$, $A^9$ between which the tape is passed, these rollers being arranged one above the other on separate shafts $A^{10}$, $A^{11}$ journaled respectively in bearings $A^{12}$, $A^{13}$ formed in extensions of the top guide plate $A^1$. The lower roller $A^9$ is keyed to its shaft $A^{11}$ and is provided with teeth or pins $a^3$ adapted to engage the feed perforations $t$; while the upper roller $A^8$ is loose on its shaft $A^{10}$ and is formed with a peripheral groove $a^4$ (Fig. 8) to clear the teeth $a^3$ of the lower roller. The shaft $A^{11}$ is extended forwardly and carries a ratchet wheel $A^{14}$ (Figs. 8 and 16), with which is associated a feed pawl $A^{15}$ and a retarding detent $A^{16}$, the former being pivotally connected to a horizontal rocker arm $A^{17}$ loosely mounted on said shaft, and the latter being pivotally mounted on a lateral projection of the front bearing $A^{13}$. According to this arrangement, when the arm $A^{17}$ is rocked upwardly and downwardly, the ratchet wheel $A^{14}$ is operated intermittently by the pawl $A^{15}$ and the tape T fed step by step by the toothed roller $A^9$ past the respective punch rods $A^5$, $A^6$.

The operation of the rocker arm $A^{17}$ is effected by a vertical slide bar $A^{18}$, to which the arm is connected by a link $A^{19}$ through a horizontal member $A^{20}$ projecting laterally from said bar. The bar $A^{18}$, as shown in Fig. 15, is flared at the top and formed with an aperture $A^{21}$ in order to permit the passage of the tape therethrough at all times. At its upper end, adjacent the aperture $A^{21}$, the bar $A^{18}$ is guided in the top plate $A^1$, and about midway of its length, it is similarly guided and sustained in a rectangular block $A^{22}$ spaced below the lower guide plate $A^2$ and rigidly connected thereto by four tie rods $A^{23}$. A spring $A^{24}$, seated in the base plate $A^4$ beneath the bar $A^{18}$, holds the latter resiliently in its raised position against the block $A^{22}$ through the medium of a stop pin $A^{25}$ projecting from said bar. The feed punch rod $A^6$ is also operated by the slide $A^{18}$, which, for the purpose, is provided with a horizontally disposed finger plate $A^{26}$ fastened to the top surface thereof and firmly connected to said punch rod. It will now be seen that, as the slide $A^{18}$ is moved downwardly against the tension of the spring $A^{24}$, the punch rod $A^6$ will be forced through the tape and the pawl $A^{15}$ caused to ride over one tooth of the ratchet $A^{14}$ and drop in behind the next lower or succeeding tooth, the ratchet $A^{14}$ at such times being locked against retrograde rotation by the detent $A^{16}$. On the return or upward movement of the slide, however, as effected by the spring $A^{24}$, the punch rod $A^6$ is lifted clear of the tape and the latter advanced one step forward in the manner above described, the pin $A^{25}$ banking against the block $A^{22}$ to stop the slide in its raised position. A certain amount of lost motion is allowed between the feed pawl $A^{15}$ and its ratchet wheel $A^{14}$ to insure the withdrawal of the punch rod $A^6$ from the tape before the latter is advanced. In the present instance, the slide $A^{18}$ is operated by a solenoid $A^{27}$, which is supported on a bracket $A^{28}$ secured to the base plate $A^4$, and which is energized intermittently from a storage battery or generator Y (see diagram, Fig. 20). An operative connection between the slide $A^{18}$ and magnet $A^{27}$ is established by means of a lever $A^{29}$ pivoted about midway of its length in a stationary support $A^{30}$ and loosely connected at its opposite ends, respectively, to the core of the solenoid, and the lower end of the slide.

The perforators or punch rods $A^5$ are intended to produce in the tape T perforations $t^1$ (see Fig. 18), which constitute the symbols hereinbefore referred to representing the different matrices and spacers used in the slug casting machine to be controlled by the tape. The punch rods $A^5$ are mounted and guided at their upper ends in the lower guide plate $A^2$ and at their lower ends in the block $A^{22}$, the latter being recessed in its lower face to receive a hardened strip $A^{31}$ (Fig. 17), which serves to sustain the rods at such level that the upper ends thereof are located in proper spaced relation below the tape T. The several rods $A^5$ are operatively connected through horizontally disposed levers $A^{32}$ to as many different magnets $A^{33}$, which latter are capable of functioning independently of each other in operating the punch rods to produce the symbols in the tape. The levers $A^{32}$ are pivoted to posts $A^{34}$ secured to the base plate $A^4$ and have their free ends disposed slightly above and in contacting relation to the cores or poles of the magnets $A^{33}$, the latter being arranged in a group in the manner shown in Fig. 8 upon the base plate $A^4$ and energized through a separate circuit from the generator Y.

Figures 8, 9:
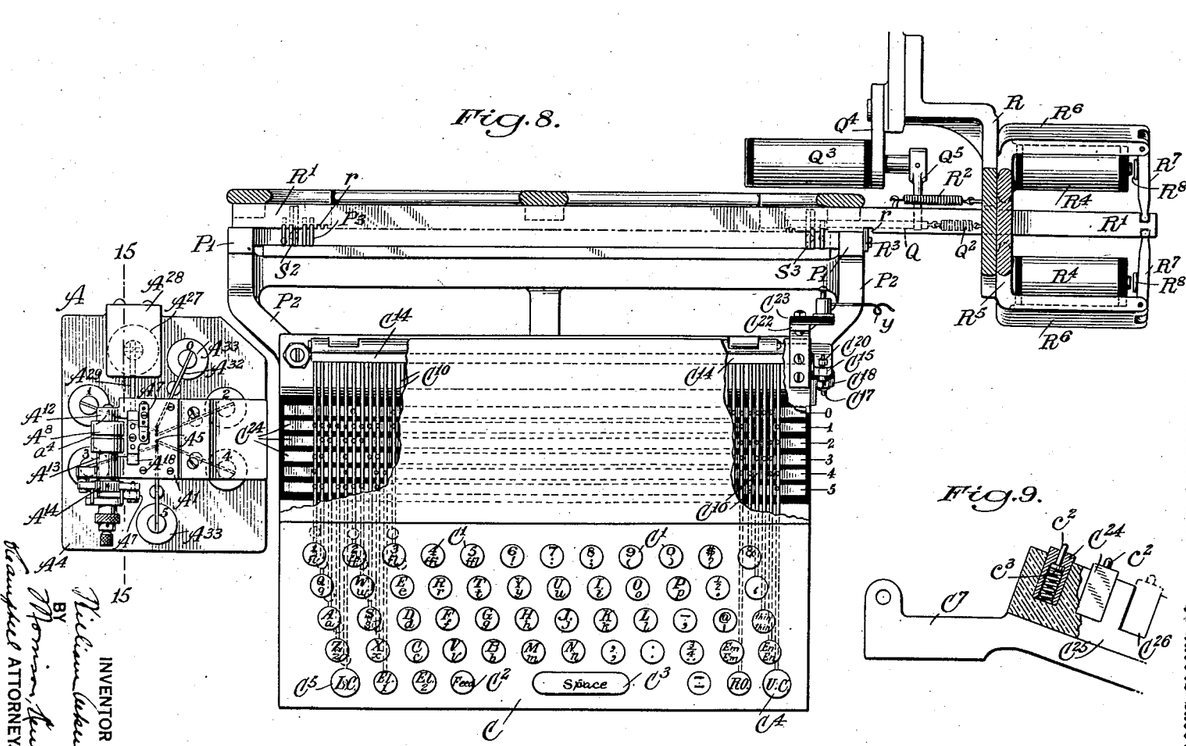
Fig. 8 is a plan view of the keyboard and perforating unit, with portions of the keyboard broken away to show the interior construction.
Fig. 9 is an enlarged detail view of the electrical contacts acted upon by the finger keys of the keyboard.

The operation of the punch rods $A^5$ is controlled through the magnets $A^{33}$ by the actuation of the finger keys $C^1$ of the keyboard C, which latter as shown in Fig. 8 also includes a special finger key $C^2$ for actuating the feed perforator $A^6$ through the solenoid $A^{27}$ and the connections above described. The keyboard C, as herein shown (although it need not be), is of the typewriter variety, being provided with the usual spacer key $C^3$ and two other special keys $C^4$, $C^5$ marked respectively "UC" and "LC", one for the upper case characters and the other for the lower case characters. Since the perforations $t^1$ produced in the tape T by the perforating unit A are intended to be used in operating a linotype machine, the keyboard also includes two further special keys, marked "El. 1," and "El. 2," for controlling respectively the lifting of the assembling elevator after a line has been composed therein, and the restoration of the same to its original receiving position for the composition of a succeeding line.

The keyboard (see Fig. 7) is preferably insulated from the bed plate O, to which it is secured, and comprises generally a top plate $C^6$, a bottom plate $C^7$, and two side plates $C^8$. The finger keys $C^1$ are in the form of vertically disposed push rods, projecting downwardly through the top plate $C^6$, and provided with collars or shoulders $c$, which are held resiliently engaged with the lower face of said plate under the tension of light compression springs $c^1$ surrounding the rods and located directly beneath the key buttons. The lower ends of the key rods $C^1$ terminate in the same horizontal plane and are connected respectively, through small bell-crank levers $C^9$, to a corresponding series of fore-and-aft key bars $C^{10}$, which are suspended near their rear ends by links $C^{11}$ from the cross member of brackets $C^{12}$ depending from opposite sides of the top plate $C^6$. These key bars $C^{10}$ (as will be noted in Fig. 7) present portions $C^{13}$ inclined upwardly toward the rear, so that these inclined portions, for reasons presently to appear, will be moved edgewise as the key bars, through the links $C^{11}$ and bell-cranks $C^9$, are swung rearwardly by the depression of the finger keys $C^1$ (see dotted lines in Fig. 7). The springs $c^1$ are adapted, of course, when the keys are released to restore the parts to their normal position.

The keyboard mechanism also includes a vertically disposed rocker plate $C^{14}$ (Figs. 4, 7 and 8) hingedly connected at its lower edge to the fixed bottom plate $C^7$ and extending longitudinally across the keyboard with its front face in contact with the rear ends of the key bars $C^{10}$. At the extreme right, the plate $C^{14}$ is provided with an integral arm $C^{15}$ rising from the upper edge thereof outside of the keyboard and connected by a pull spring $C^{16}$ to the adjacent side plate $C^8$. The arm $C^{15}$ banks against an adjustable stop screw $C^{17}$ and is provided with a terminal point $C^{19}$, which is adapted when the rocker plate is swung about its hinged axis, to make and break an electric contact with a corresponding terminal $C^{20}$ connected directly to the generator Y. The terminal $C^{20}$ is carried at the lower end of a flat spring metal plate $C^{21}$, which is sustained by an angle piece $C^{22}$ screwed to the top plate of the keyboard, but which is insulated therefrom by a suitable insulation block $C^{23}$. When the two terminals are brought into contact, a current is transmitted through a series of intermediate conductor bars $C^{24}$ to the punch magnets $A^{33}$ and the feed solenoid $A^{27}$.

Figure 7:
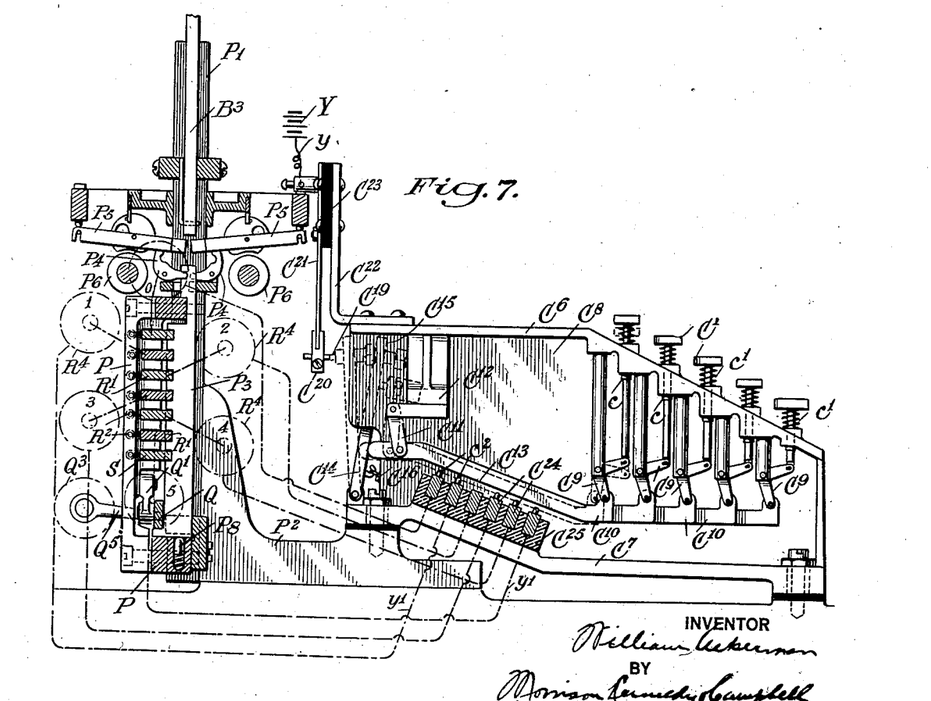
Fig. 7 is an end elevation, largely in vertical section, of the keyboard and the power-operated devices controlled thereby for effecting the release of the indicators of the composing unit.

The conductor bars $C^{24}$ (six in number), one for each magnet $A^{33}$, are arranged longitudinally of the keyboard C (from one side to the other) and are mounted in separate grooves $C^{26}$ formed in a block of insulation $C^{25}$, the latter being secured to the bottom plate $C^7$ and located directly beneath the inclined portions $C^{13}$ of the key bars $C^{10}$ (see Figs. 7 and 8). Each conductor bar $C^{24}$ is provided with a plurality of contact pins or points $c^2$ spaced different distances apart and projecting slightly above the top surfaces of said bars into the path of one or another of the key bars $C^{10}$. Light compression springs $c^3$, arranged beneath the pins (Fig. 9) and seated against the bottom of the grooves $C^{26}$, hold the pins resiliently in place. The pins of the respective bars vary in number but are aligned transversely with the pins of adjacent bars so as to provide a definite predetermined combination of one or more contacts for each of the various finger keys. This pin arrangement is clearly illustrated in Fig. 8, where, for example, the combination for the first finger key bearing character "1," would comprehend the conductor bars marked at the right "1", "3", "4", "5"; that for the sixth key bearing character "2", the bars "0", "1", "2"; and that for the tenth key bearing the abbreviation "El. 1" the single conductor "4".

As a result of the foregoing arrangement, when a finger key is depressed, the inclined portion $C^{13}$ of the connected key bar $C^{10}$ is swung into contact with certain conductor bars $C^{24}$ through the appropriate pins $c^2$, and the rear end of the bar caused to rock the plate $C^{14}$ rearwardly. As the terminal $C^{19}$ in the arm $C^{15}$ contacts with the terminal $C^{20}$ on the plate $C^{21}$, a circuit with the generator Y is closed and a current transmitted through the key bar $C^{10}$ and conductor bars $C^{24}$ to the corresponding magnets $A^{33}$, which in turn actuate the particular punch rods $A^5$ with which they are connected. A perforation combination or symbol is thus produced in the tape T representative of the character borne by the key depressed, which symbol is adapted to release a corresponding matrix when the tape is run through a linotype machine. The feed solenoid $A^{27}$ is also energized at this time by the contact of the terminals $C^{19}$ and $C^{20}$, but through an independent circuit (see the diagram, Fig. 20), so that the punching of the feed perforations is carried on simultaneously with the punching of the perforation symbols and with each depression of a finger key. It may also be observed, that there is included in this independent circuit a relay $Y^1$ which is intended, as an element of safety, to delay the advance of the tape until the punch rods $A^5$ have been completely withdrawn therefrom. When the finger key is released, the electrical contacts are instantly broken by the action of the springs $C^{16}$ and $c^1$ in restoring the parts to their normal position.

While the symbols thus produced in the tape are capable of releasing the matrices and spacers they represent, the problem to be solved, as previously stated, is that of accurately determining the number of symbols which should be produced in the tape to represent a composed line of matrices and spacers of a given length. The present invention is intended to meet this situation by combining with the tape perforating unit A the composing unit B, and by operating the composing unit from the keyboard C through intermediate mechanism later to be described, such that, as each symbol is produced in the tape, there is composed in line a typographical element or indicator corresponding in thickness to the matrix or spacer represented by said symbol. In this way, whatever the length of the line may be, the required number of symbols produced in the tape will be automatically determined when the composition of the line of typographical elements or indicators is completed.

Figure 1:
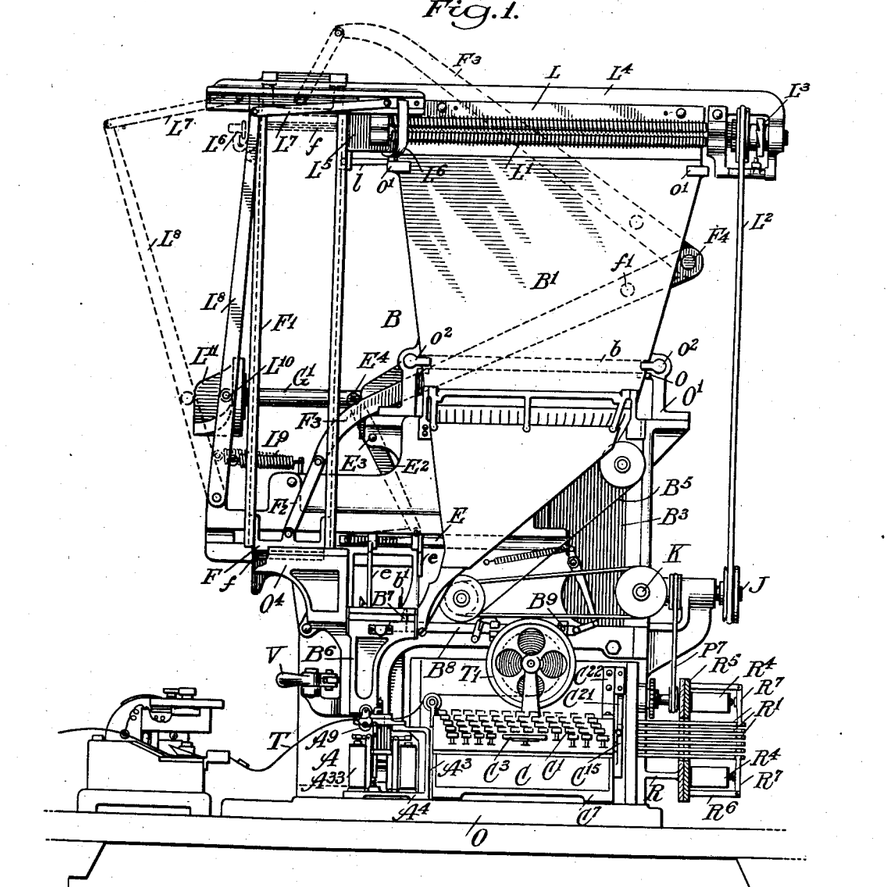
Fig. 1 is a front elevation of the improved machine.
Figure 2:
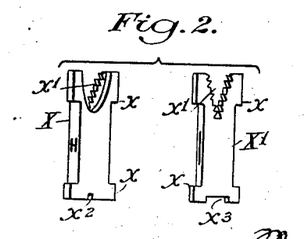
Fig. 2 illustrates two of the indicators employed in said machine, the one at the left representing a character bearing matrix, and the one at the right representing a justifying spacer.

Referring now to Figs. 1 to 5, inclusive, the indicators employed, and as shown in Fig. 2, are similar in form to, and in fact actually may be, linotype matrices, being provided at their four corners with the projecting ears $x$ and at the top with the V-shaped notch and distributing teeth $x^1$. The indicator shown at the left of Fig. 2 represents a character-bearing matrix and is formed in its bottom edge with the font distinguishing notch $x^2$, while the indicator shown at the right represents a linotype spacer and is substantially of the same form as the matrix indicator, except that it is provided with a relatively wider font notch $x^3$ so that it may be used in fonts or sets of different sizes. A complete set of these indicators (corresponding in thickness to the matrices and spacers of the linotype machine to be controlled by the perforated tape) is stored in a channeled magazine $B^1$, which is equipped with a series of escapements $B^2$ for effecting the release of the indicators, one at a time, from their respective magazine channels.

The magazine $B^1$, as shown, is disposed in a vertical plane and supported near its lower end and at opposite sides upon lugs $o$ projecting forwardly from side brackets $O^1$ of the main frame, and engaging the lower cross rib $b$ of the magazine (Fig. 1). At the top, the magazine is sustained facewise against their side brackets by means of a pair of fixed retaining blocks $o^1$ and at the bottom by corresponding spring pressed locking fingers $o^3$, which latter may be turned at will to inactive position to release the magazine for removal and replacement by a magazine containing another set of indicators of a different size.

The escapements $B^2$ are actuated by a series of vertical reciprocating reeds $B^3$ through a corresponding series of horizontal rocking levers $B^4$ (Fig. 4) pivoted at their rear ends and adapted as the reeds are raised, to engage the escapements and cause the release of the indicators.

The indicators when thus released are directed by the usual channeled front plate onto an inclined belt $B^5$ which is driven constantly from a short fore-and-aft shaft K geared at its rear end to the main drive shaft J. The belt $B^5$ delivers the indicators, one after another in the order of their release, into an assembling elevator $B^6$, wherein they are composed in line against an upstanding finger $B^7$ of a spring-controlled resistant slide $B^8$. This slide $B^8$ is similar to that used in commercial linotype machines, being provided with means $B^9$ adjustable at will, and according to the length of the line to be composed, for stopping the finger $B^7$ in its movement toward the left when each line is full. The length of the composed line may thus be definitely established, irrespective of the number of indicators used to fill the line.

After composition, the elevator $B^6$ is raised to position the line between the depending fingers $e$ of a transfer slide E, which carries the line horizontally to the left through an intermediate guide channel $O^4$ (Figs. 1 and 3a) and into engagement with a longitudinally ribbed bar $f$ of an elevator F, the latter being associated with a distributing mechanism arranged above the magazine and adapted to restore the composed line of indicators to their respective magazine channels.

The elevator F (see Fig. 1) is slidably mounted in fixed vertical guide-ways $F^1$ and is connected by a link $F^2$ to the free end of a long lever $F^3$, which latter is pivoted at its opposite end on a bearing stud $F^4$ and operable in a vertical plane behind the magazine $B^1$, to raise the elevator to the distributing level, and later return it to its line receiving level. The lever $F^3$ is operated by a cam $F^5$ keyed to a vertical shaft $F^6$ and formed with a groove $F^7$ wherein engages an anti-friction roller $f^1$ carried by the lever $F^3$. The shaft $F^6$ is journaled in upper and lower bearings $O^2$, $O^3$ projecting rearwardly from the right side bracket $O^1$, and is driven directly from the main shaft J through a sprocket chain $F^8$ and stub shaft $F^9$ by a set of worm gears $F^{10}$ arranged below the cam $F^5$.

Figure 3:
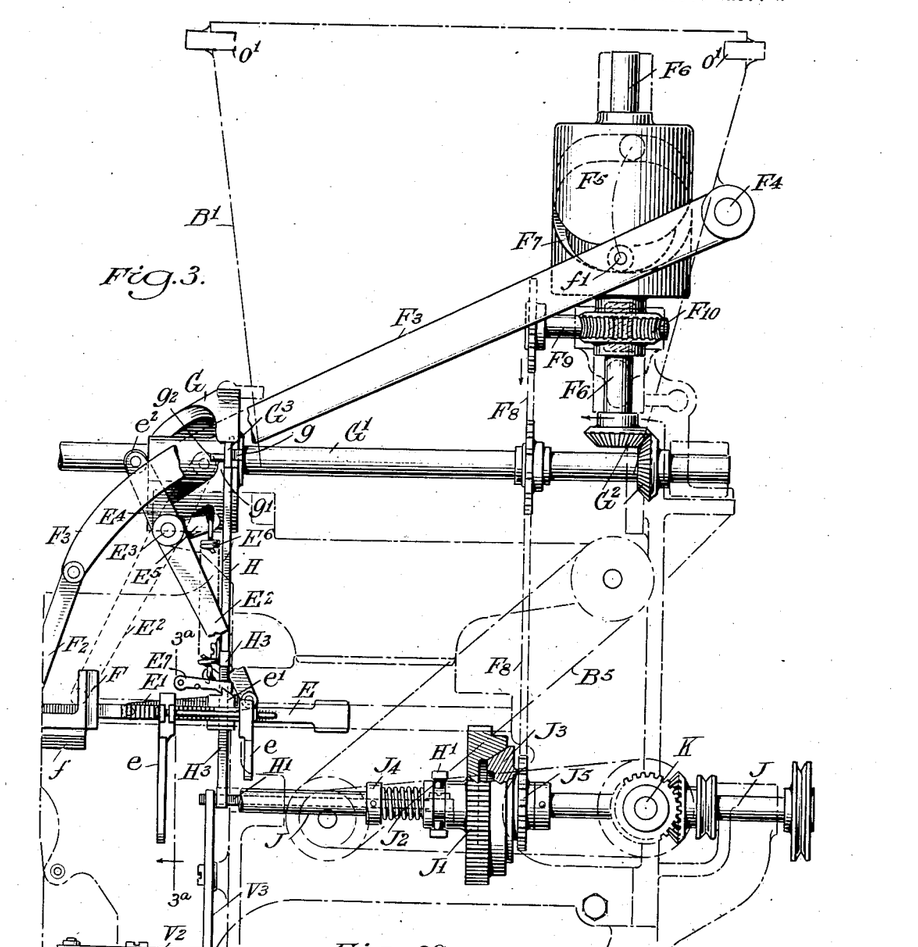
Fig. 3 is a front elevation showing in skeleton the power connections for operating the moving parts of the composing unit, the magazine and the assembling mechanism being indicated by the broken lines.
Figure 3A:
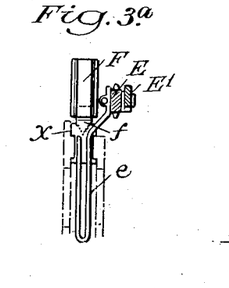
Fig. 3a is a vertical cross section taken on the line 3a—3a of Fig. 3, looking in the direction of the arrows.
Figures 4, 5:
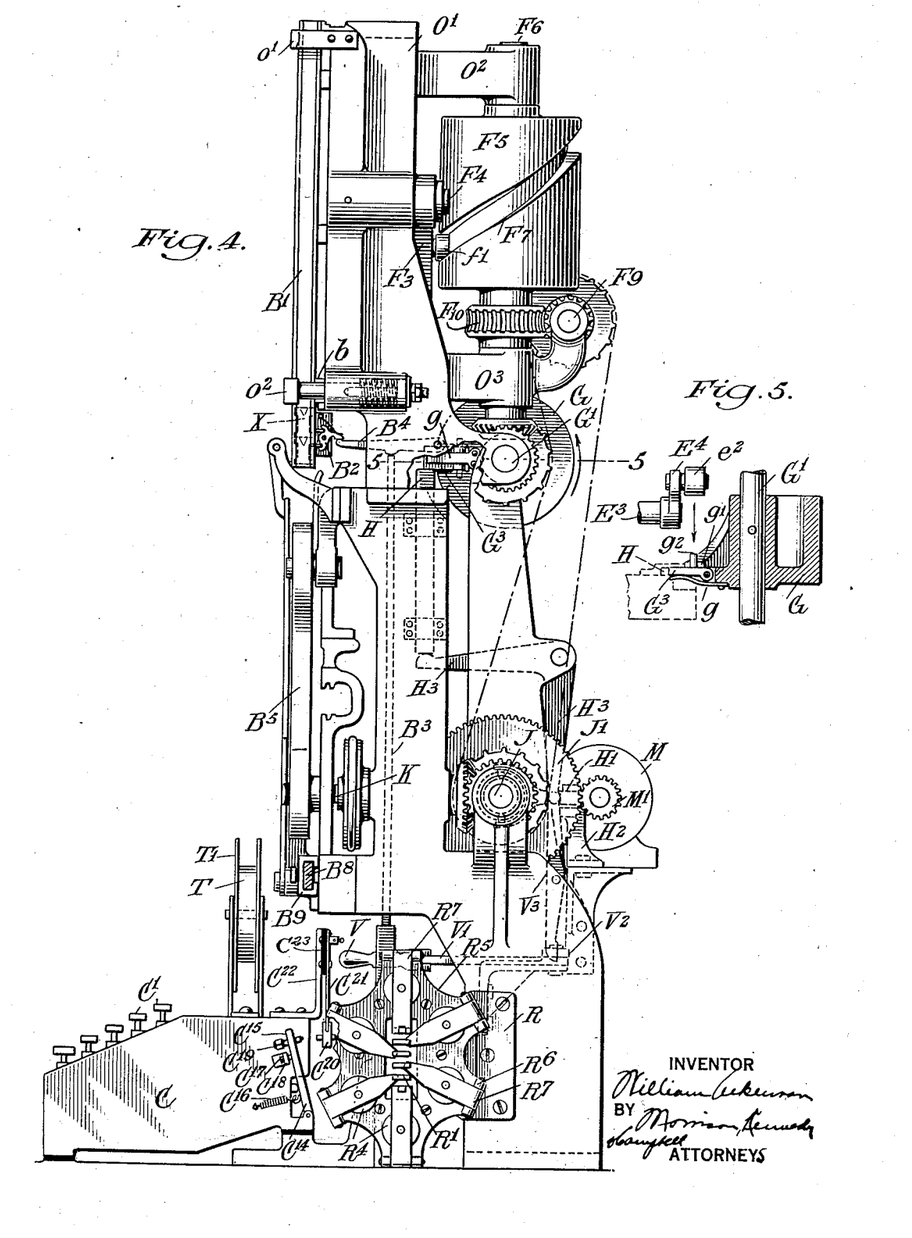
Fig. 4 is a side elevation looking from the right in Fig. 1 of the complete machine, certain of the parts being broken away to show the interior construction.
Fig. 5 is a horizontal section taken on the line 5—5 of Fig. 4, looking downwardly in that figure.

In the present machine, (as is the case with the commercial linotype machine), the cycle of operation of the composing unit B is automatically inaugurated when a composed line is transferred from the assembling elevator $B^6$, the mechanism employed and the connections between the various moving parts being clearly shown in Figs. 3 and 4. The line transfer slide E is connected by a link $E^1$ to the lower end of a lever arm $E^2$ depending from a fore-and-aft rock shaft $E^3$, the latter being also provided with an upright arm $E^4$ and connected through a short crank arm $E^5$ to a pull spring $E^6$ which is anchored to the framework and tends constantly to turn the shaft in a clockwise direction. Normally, the slide E is locked in its receiving position against the tension of said spring by a horizontally disposed pawl or trigger $E^7$, which is arranged in the path of a toothed plate $e^1$ carried by the slide and controlled by a thin vertical rod $b^1$ projecting upwardly from the assembler elevator $B^6$. When the assembler is raised, the rod $b^1$ lifts the pawl out of engagement with the slide E, which, when thus released, is moved to the left by action of the spring $E^6$ and carries the composed line of indicators into engagement with the elevator bar $f$. The upright arm $E^4$, at the same time, is swung to the right and a roller $e^2$ mounted in the free end thereof is caused to engage the low portion of a face cam G secured to an intermediate shaft $G^1$ driven by the vertical shaft $F^6$ through a pair of beveled gears $G^2$. The cam G, as best shown in Fig. 5, is provided with a hinged trip plate $G^3$, which is held resiliently by a spring $g$ against a stop $g^1$ formed on the cam, and which is provided with a pin or stud $g^2$ projecting laterally therefrom into the path of the roller $e^2$. The plate $G^3$ is normally disposed in the path of a vertical slide bar H and is adapted, as each machine cycle is completed, to engage and depress the slide and thus disengage the main drive clutch to stop the machine.

The connections employed for disengaging the main drive clutch (see Figs. 3, 4 and 6) consist of a clutch lever $H^1$ mounted for movement in a horizontal plane upon the fixed bracket $H^2$, and an intermediate bell-crank lever $H^3$ arranged in a vertical plane and having its respective arms disposed in operative relation to the slide H and the longer arm of the clutch lever $H^1$. The shorter arm of the lever $H^1$ is forked to engage one clutch member $J^1$ splined to the shaft J and geared directly to the pinion $M^1$ of a motor M. A spring $J^2$, surrounding the shaft J and reacting against a fixed collar $J^4$ thereon, is employed to hold the clutch member $J^1$ resiliently engaged with its companion $J^3$, the latter being loose on the shaft J but anchored against axial movement and provided with a sprocket wheel $J^5$ for driving the chain $F^8$, before mentioned.

It will now be seen that, when the line transfer slide E is released and the arm $E^4$ of the rock shaft $E^3$ is thrown to the right by action of the spring $E^6$, the trip plate $G^3$ of the cam G will be pushed by the roller $e^2$ out of engagement with the slide H and through the bell-crank $H^3$ and clutch lever $H^1$ will allow the spring $J^2$ to press the clutch member $J^1$ into engagement with its opposing member $J^3$. The cycle of operation is immediately started, motion being transmitted through the chain $F^8$ to the shaft $F^6$ and thence through the worm gears $F^{10}$ to the intermediate shaft $G^1$. As the cam $F^5$ rotates, the lever $F^3$ is swung upwardly to carry the elevator F and a line of composed indicators thereon to the distributing level, and the cam G at the same time, by its engagement with the roller $e^2$ on the arm $E^4$, rocks the shaft $E^3$ in the opposite or anti-clockwise direction to restore the transfer slide to its original position, the pawl $E^7$ being cammed upwardly by the plate $e^1$ and then allowed to drop into locking position in front of the teeth of said plate. As the cycle of operation continues, the distributor elevator is lowered and when it reaches its original or receiving position, the trip plate $G^3$ is adapted by rotation of the cam G to depress the slide H and through the connections before described move the clutch member $J^1$ against the tension of its actuating spring $J^2$ out of engagement with the loose member $J^3$, thereby completing the cycle of operation and stopping the machine.

Figure 6:
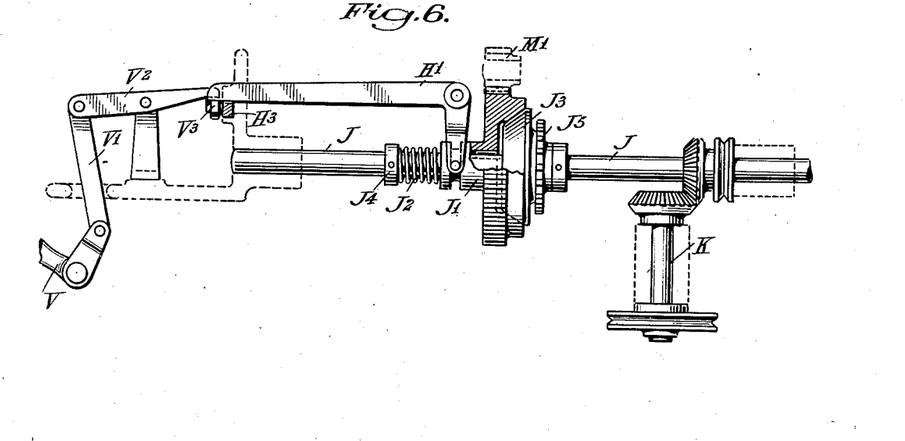
Fig. 6 is a detached plan view of the clutch devices which control the operation of the main operating shaft of the composing unit.

Since it is usually advisable in mechanisms of this character to include means for controlling the clutch by hand, the present machine is also provided with a pivoted handle V (Figs. 1 and 4) arranged conveniently at the front and adapted, when rocked about its axis, to actuate the clutch lever $H^1$, through the medium of a link $V^1$, a horizontal lever $V^2$ and a vertical lever $V^3$ (see also Fig. 6).

The distributing mechanism herein employed is also similar to that of the commercial linotype machine, comprising the ordinary ribbed distributor bar L and the associated set of conveying screws $L^1$, the latter being driven constantly by a belt $L^2$ from the main drive shaft J through an automatic trip device $L^3$. This mechanism as shown in Fig. 1, is sustained by a horizontal bracket $L^4$ supported upon the side brackets $O^1$, and includes a distributor box $L^5$ of usual construction and a line transfer finger $L^6$, the former being arranged at the receiving end of the distributor proper and having a lifting finger $l$ to feed the indicators one at a time, to the distributor screws $L^1$. The transfer finger $L^6$ is connected by a link $L^7$ to the upper end of a vertically disposed rocking lever $L^8$ pivoted at its lower end to the main frame and actuated by a pull spring $L^9$. Between its ends, the lever $L^8$ is provided with a roller $L^{10}$ arranged to engage a face cam $L^{11}$ secured to the outer end of the shaft $G^1$. The cam $L^{11}$ is so shaped that, as the shaft is rotated, it will rock the lever $L^8$ against the tension of the spring $L^9$ toward the left far enough to locate the attached transfer finger $L^6$ clear of the path of the distributor elevator F (see the dotted lines in Fig. 1). This operation, during each cycle, is timed to take place just before the elevator F reaches the distributor level, so that the finger $L^6$ will be properly located to strip the matrices from the elevator bar $f$ and push them into the distributor box as the lever $L^8$, by the action of the spring $L^9$ and under the control of the cam $L^{11}$, is rocked in the opposite direction.

Figure 12:
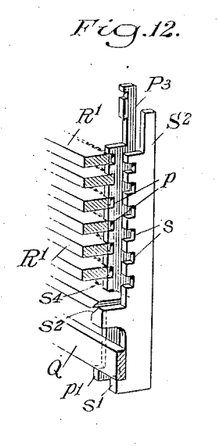
Fig. 12 is a perspective view of certain of the parts shown in Fig. 10, showing in particular the manner in which the locking bars control the operation of the escapement devices.

The intermediate mechanism provided for operatively connecting the keyboard C with the composing unit B will now be described. As best shown in Figs. 7 and 8, this mechanism is carried in a frame P arranged at the rear of the keyboard and fastened to upright side posts $P^1$ rising from fixed bracket members $P^2$ of the bed plate O. The operative elements thereof consist of a series of vertical slides $P^3$ mounted and guided in the frame P and which are formed in their rear edges (see Fig. 12) with notches $p$ and at their extreme lower ends with lugs or shoulders $p^1$ projecting rearwardly therefrom. These slides $P^3$ correspond in number to the escapement actuating reeds $B^3$ and are arranged below the same with their upper ends in position to control, through trip dogs $P^4$, two rows of cam yokes $P^5$, which are pivoted at their outer ends and disposed horizontally above a pair of rolls $P^6$, the latter being driven constantly by a belt $P^7$ from the main drive shaft J (see Fig. 1). The inner ends of the yokes are located directly beneath the respective reeds, so that when a slide $P^3$ is raised, the cam yoke associated therewith will be released by the intervening trip dog and its rotary cam allowed to engage the periphery of the underlying roll $P^6$. This engagement causes rotation of the cam and a consequent rocking of the yoke, which is adapted in turn to engage the reed above and lift it to actuate a corresponding escapement. These power operated devices are or may be the same as those employed in the standard linotype machine, and a more detailed description thereof is therefore unnecessary.

Figure 10:
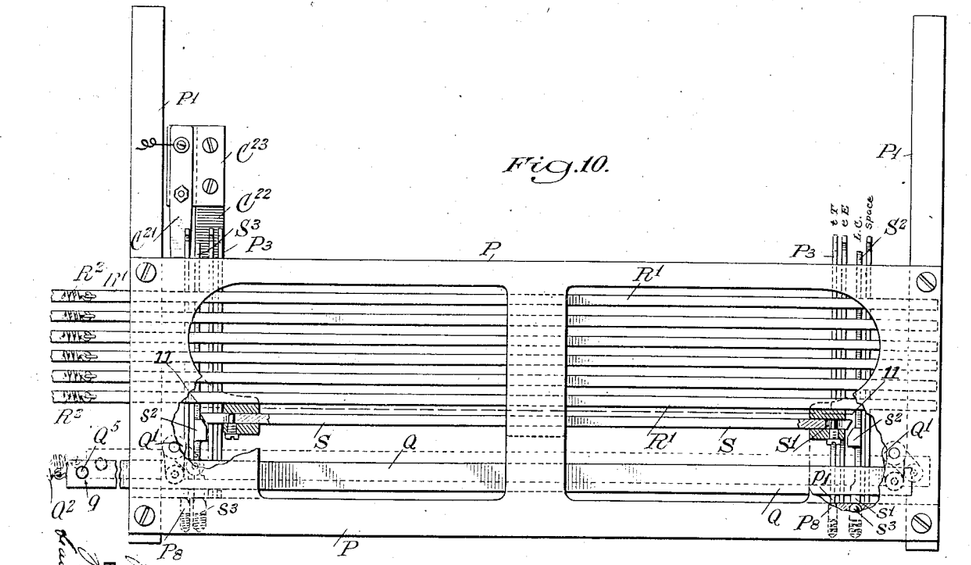
Fig. 10 is a rear elevation of the locking bars which govern the operation of the power-operated escapement devices associated with the composing unit.

The slides $P^3$ are raised by means of spring-actuated detents $P^8$ mounted in the frame P beneath the respective slides, and are returned to their lower position against the action of the detents by a bar Q common to all of the slides and arranged in engagement with the lugs $p^1$. The bar Q (see Fig. 10) is suspended from the frame P near the opposite ends thereof by a pair of links $Q^1$ and is movable longitudinally in opposite directions to lock and release the slides $P^3$. A pull spring $Q^2$, connected to the bar at the extreme right and anchored to a fixed bracket R of the main frame, holds the bar resiliently in its locking position (shown by the full lines in Fig. 10), and a solenoid $Q^3$ (Fig. 8) is employed to swing the bar against the tension of said spring to its releasing position (indicated by the dotted lines in Fig. 10). The solenoid $Q^3$ is supported by a fixed bracket arm $Q^4$, and its core member is provided with a finger $Q^5$, which projects forwardly therefrom and engages in a transverse aperture $q$ formed in the bar Q (see Figs. 8 and 10). Like the feed solenoid $A^{27}$, the solenoid $Q^3$ is energized every time the rocker plate $C^{14}$ makes a contact with the terminal $C^{20}$, and it also is controlled by a separate or independent circuit, preferably through the relay $Y^1$ (see diagram, Fig. 20).

Figure 11:
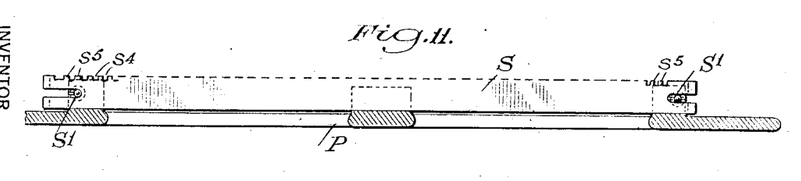
Fig. 11 is a section taken on the line 11—11 of Fig. 10.

The operation of the slides $P^3$ is controlled by a series of six horizontal main notched locking bars $R^1$ and a master or auxiliary notched locking bar S, all of which are slidably mounted in the frame P for a slight longitudinal movement in opposite directions and are arranged in superposed spaced relation with their front or notched edges engaged with the respective notches $p$ of the vertical slides $P^3$. The lowermost bar S is shorter than the bars $R^1$ and is sustained at its opposite ends by pin and slot connections $S^1$ which also serve to limit its longitudinal movement (see Fig. 11). The operation of the bar S is effected by means of a pair of special slides $S^2$, $S^3$ located respectively adjacent the opposite ends of the bar S and which, in many respects, are similar to the slides $P^3$, being formed with corresponding notches $s$ and at their lower ends with lugs $s^1$ for engagement with the retaining bar Q. Unlike the slides $P^3$, however, the special slides $S^2$, $S^3$ are also formed with beveled cam surfaces $s^2$ and moreover have no connection whatever with the cam yokes $P^5$ or the associated reeds $B^3$. Their only function is to shift the bar S in one direction or the other as they are raised by means of spring-actuated detents $s^4$, which are somewhat larger than the detents $P^8$ of the slides $P^3$ so as to be capable of overcoming the frictional resistance presented by the bar S. The main locking bars $R^1$ are held resiliently toward the right, under the tension of pull springs $R^2$, against a vertical stop plate $R^3$, which is secured to the right-hand post $P^2$ and projects into a recess $r$ formed in each of said bars (Fig. 8). The shifting of the bars in the opposite direction is effected by a series of magnets $R^4$, each bar being connected to an individual magnet and operable thereby independently of the other bars. The several magnets (Figs. 4 and 8) are mounted upon and conveniently distributed around a supporting bracket $R^5$, which is secured to the fixed bracket R and formed with lateral extensions $R^6$, the latter being located adjacent the respective magnets and projecting slightly beyond the outer ends thereof. The locking bars $R^1$ extend through openings in both of said brackets and are operatively connected to the respective magnets by intermediate plate levers $R^7$ hinged to the extensions $R^6$ and provided with contact points $R^8$ aligned with the magnet cores or poles.

Figures 13, 14:
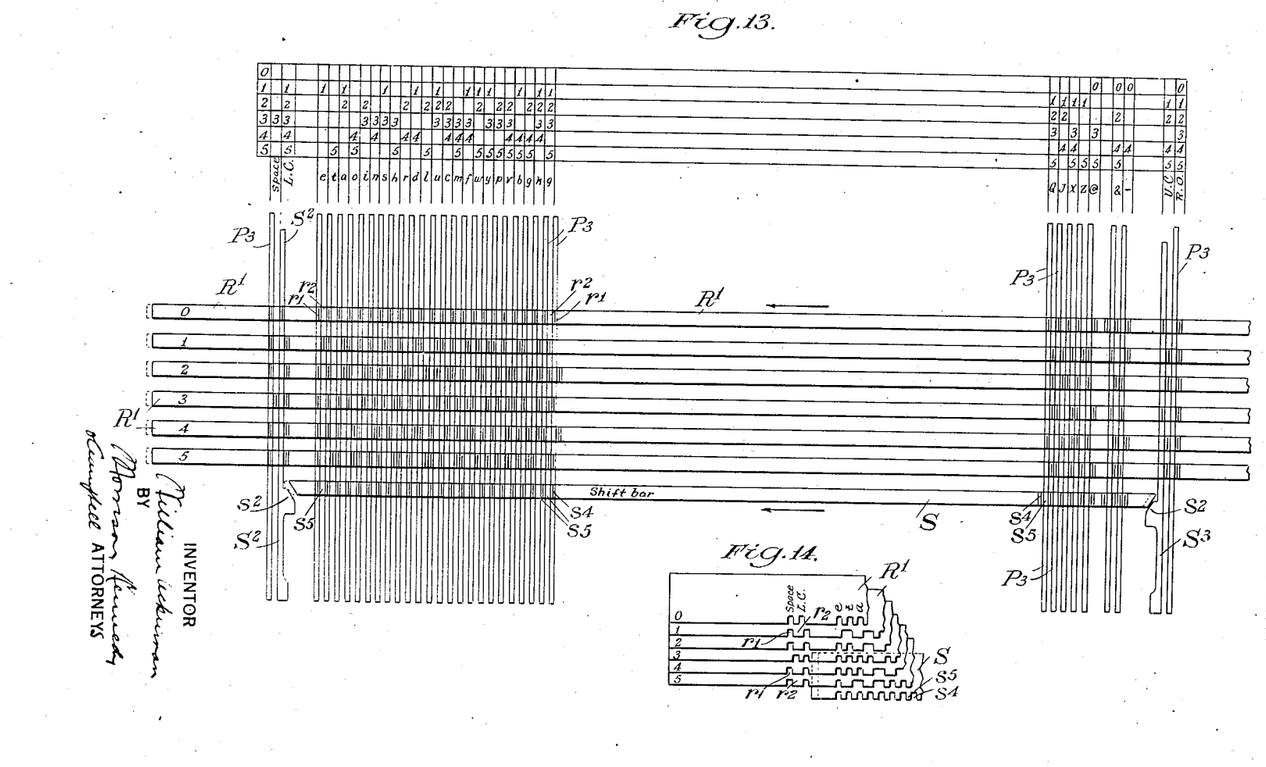
Fig. 13 is a view somewhat similar to Fig. 10, showing the combination system employed in operating the escapement reeds under the control of the locking bars.
Fig. 14 is a perspective fragmentary view of the locking bars and the associated case selecting bar.

The front edges of the bars $R^1$ are formed with notches $r^1$ and intervening teeth or locking portions $r^2$ (see particularly Figs. 13 and 14). The arrangement of these notches in the respective bars is such that by shifting the bars singly or in groups a slight distance to the left, they will provide a series of releasing combinations, one for each of the slides $P^3$. For a clearer conception of this particular phase of the invention, reference may be had to Fig. 13, which shows diagrammatically the locking bars $R^1$ in their normal or locking position, the notches $r^1$ of the bars being indicated by the shaded portions, and the teeth $r^2$ being indicated by the plain or unshaded portions. Taking for example, the slide $P^3$ for the lower case "e" (which is the third slide from the left), this slide is normally locked against actuation by the second locking bar $R^1$ from the top, which is designated by the numeral "1"; hence to release the slide, it is only necessary that this No. 1 locking bar be moved to the left. The slide $P^3$ next to the right, for the lower case "t" is similarly locked against actuation by a single one of the bars $R^1$, namely that designated No. 5 and hence is released by the movement of that particular bar to the left. The third slide $P^3$, for the lower case "a", on the other hand, is held against actuation by two of the locking bars $R^1$, namely, those designated Nos. 1 and 2, so that both of these bars must be moved in unison to the left to release the slide. The combinations vary in this way for the various slides, each combination being indicated in the chart shown at the top of Fig. 13 by numerals corresponding to those on the bars $R^1$.

Since but six locking bars $R^1$ are employed to make up the releasing combinations for the slides $P^3$, the highest possible number of combinations available would not be great enough to provide a separate combination for each of the different characters comprised within the normal matrix font of a linotype machine (usually 90 or more), and for this reason some of the releasing combinations are duplicated on the bars $R^1$. To be specific, the notches $r^1$ and teeth $r^2$ formed at the left of the bars $R^1$, and which control the actuation of the slides $P^3$ for the lower case characters as last described, are duplicated at the right of the bars to control the actuation of the slides $P^3$ for the corresponding upper case characters. Thus, by again referring to Fig. 13, it will be seen that the releasing combination for the first slide $P^3$ of the right-hand group, representing the upper case or cap "Q", is the same as that for the lower case "q", which latter happens to be the last one of the group shown at the left. As a result, when the locking bars designated "1", "2", "3" and "5" are moved to the left to create the particular releasing combination allotted to these duplicate characters, the slides $P^3$ for both would be unlocked and permitted to operate were it not for the presence of the master locking bar S before referred to. The same is true of all the other upper case characters, whose releasing combination are duplicates of the corresponding lower case characters.

The master locking bar S is therefore adapted to lock against actuation the slides $P^3$ of either the lower case group or the upper case group, as may be required. For this purpose the bar (as more clearly shown in Figs. 11 and 12) is formed in its front edge with notches $s^4$ and intermediate solid or tooth portions $s^5$, these notches and tooth portions being so arranged that when the bar is shifted to the right, as indicated by the full lines in Fig. 13, the tooth portions $s^5$ at the right will lock the upper case slides $P^3$ against actuation, while the notches $s^4$ at the left will release the lower case slides $P^3$, whereas when the bar is shifted to the left, as indicated by the dotted lines in Fig. 13, the tooth portions $s^5$ at the left will lock the lower case slides $P^3$ against actuation, while the notches $s^4$ at the right will release the upper case slides $P^3$. In this way, notwithstanding the duplication of the releasing combinations of the locking bars $R^1$, only those of the upper case group or the lower case group will be permitted to operate when the locking bars are moved to the left in the manner before described. In this connection it may be noted that the special slide $S^2$ at the left, which effects the movement of the bar S toward the right, is released for actuation by the movement of five of the locking bars $R^1$, namely, those designated Nos. "1", "2", "3", "4" and "5"; while the special slide $S^3$ at the right, which effects the movement of the bar S toward the left, is released for actuation by the movement of four of the locking bars, namely, those designated Nos. "1", "2", "4" and "5".

The slides $P^3$ at the extreme left and right of Fig. 13, representing the space key and the ruling-out key respectively, have no duplicate releasing combinations and hence do not come within the compass of the master locking bar S. The combination for the first-mentioned slide is created by the actuation of one locking bar, that numbered 3, and that for the second-mentioned slide by the actuation of all six locking bars.

Figure 20:
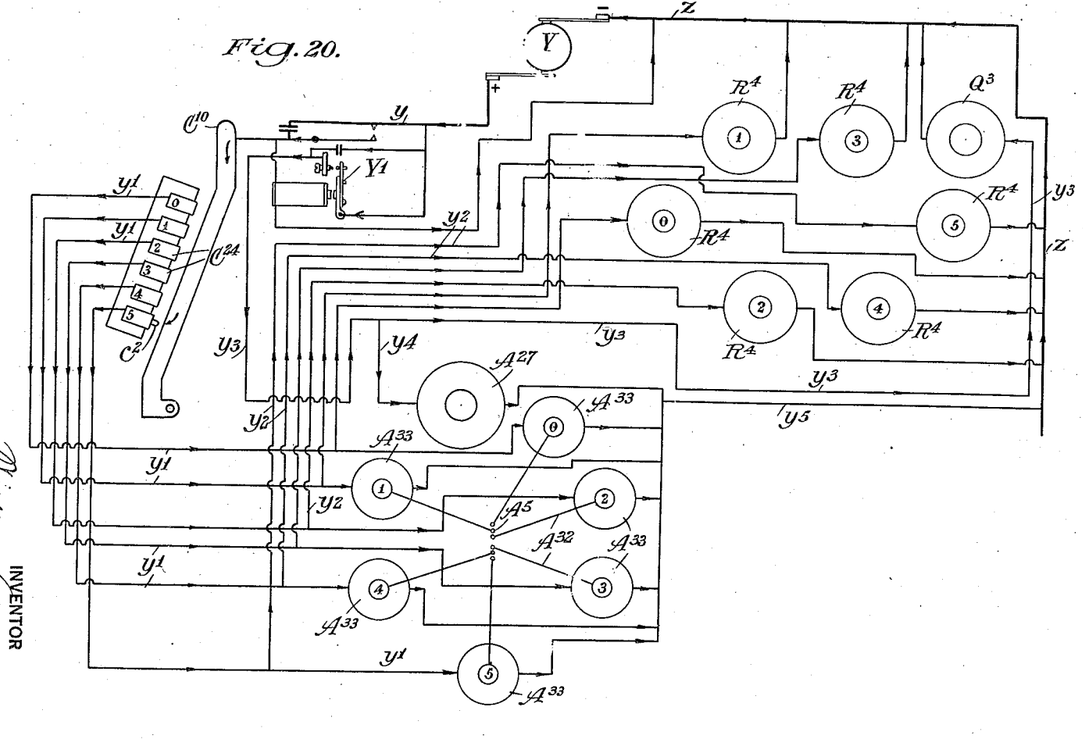
Fig. 20 is a diagram showing the electrical connections by which the keyboard controls the operation of both the perforating unit and the composing unit.

The conductor bars $C^{24}$ (as shown in the diagram of Fig. 20 and as indicated by the broken lines in Fig. 7) are connected by separate wires to the respective magnets $R^4$, so that by the depression of the finger keys, these magnets, as in the case of the punch magnets $A^{33}$, are also independently energized from the generator Y, and the operation of the bars $R^1$ thus brought under the control of the keyboard C. Through the various combinations provided by the bars $R^1$ for releasing the individual slides $P^3$ and with the aid of the shift bar S, the keyboard C, which is of the ordinary typewriter variety with approximately the same number of finger keys, is capable of controlling the operation of the reeds $B^3$, which in number are approximately double that of the finger keys. The operation of the shift bar S is controlled by the two special finger keys $C^4$, $C^5$, which are located respectively in the lower right and left hand corners of the keyboard; the one at the right being marked "UC", and the one at the left "LC." When the finger key marked "UC" is depressed, the bar S is shifted to the left by the rising of the slide $S^3$ to release the upper case group of slides $P^3$; whereas, when the key marked "LC," is depressed, the bar S is moved by the slide $S^2$ in the opposite direction to release the lower case group.

The operation of the machine and the manner in which the various units cooperate will have been understood from the detailed description given above, but a brief recapitulation may be helpful. Let it be assumed that a group of symbols is to be produced in the tape T to represent the longer line of matrices shown in Fig. 19. Since the initial character of this line is a cap "H", the upper case key $C^4$ is first depressed, whereby the key bar $C^{10}$ connected therewith is moved into contact with the conductor bars Nos. 1—2—4—5. By this operation, or when any one of the finger keys is depressed, except the feed key $C^2$, four separate circuits with the generator Y are established as the terminals $C^{19}$ and $C^{20}$ are brought into contact, although when the keys are released, the circuits are instantly broken.

The first circuit (see diagram, Fig. 20) transmits an electric current from the positive main $y$ through said conductor bars 1—2—4—5 and branch lead wires $y^1$ to the correspondingly numbered punch magnets $A^{33}$ and thence to the negative main $z$. The punch rods $A^5$ connected to these four magnets are thus actuated and produce in the tape the first perforation-combination or symbol marked "UC" in Fig. 19.

The second circuit transmits an electric current from the positive main $y$ through the same conductor bars and sub-branch wires $y^2$ to the magnets $R^4$ numbered 1—2—4—5 and thence to the negative main $z$. The four locking bars $R^1$ connected to these magnets are thus shifted to the left to establish a releasing combination for the special slide $S^3$.

The third circuit transmits a current from the positive main $y$ through the relay $Y^1$ and lead $y^3$ to the solenoid $Q^3$ and thence to the negatitve main $z$. As the solenoid $Q^3$ is energized, the retaining bar Q is swung to the left (right in Fig. 10) and frees the affected slide $S^3$, which, in arising under the influence of its spring-actuated detent $s^3$, shifts the bar S to the left to lock the group of slides $P^3$ controlling the lower case characters and to unlock the slides controlling the upper case characters.

The fourth circuit transmits a current from the positive main $y$ through the relay $Y^1$ and a branch $y^4$ of the lead $y^3$ to the feed solenoid $A^{27}$ and thence through the return wire $y^5$ to the negative main $z$. The overhead punch $A^6$ is thus actuated to produce in the tape a feed perforation $t$, whereby the tape is advanced one step by the subsequent actuation of the pawl and ratchet devices $A^{14}$, $A^{15}$.

In the foregoing operation, the only units brought into play are the keyboard and perforating mechanism, it being remembered that the slides $S^2$, $S^3$, which actuate the bar S, have no connection with the power mechanism for operating the escapement reeds $B^3$. However, when the key bearing the character "H", is next depressed, the same circuits will be established, but at this time the punch magnets $A^{33}$, numbered 3—5, are rendered active through the correspondingly numbered conductor bars $C^{24}$ and produce in the tape the second symbol marked "H" in Fig. 19, the two magnets $R^4$ indicated by the same numerals (Fig. 7) being also energized at the same instant to shift the connected locking bars $R^1$ toward the left to establish a releasing combination for the particular slide $P^3$ affected. After the solenoid $Q^3$, which is energized each time any finger key is actuated, raises the retaining bar Q clear of the lugs $p^1$, the affected slide $P^3$ is allowed to rise under the influence of its spring detent $P^8$ to trip the cam yoke associated therewith. As the yoke rises, it lifts the overlying reed $B^3$ and thus causes the release from the magazine $B^1$ of an indicator X, which corresponds in thickness to the matrix "H" shown in Fig. 19,—the one to be released by the second symbol when the tape is run through a linotype machine. The indicator, after its release from the magazine, passes on to the assembler belt $B^5$ and thence to the assembler $B^6$, where it is arrested in upright composing position against the resistant slide finger $B^7$.

The next two matrices of the line happen to bear the lower case character "i" and the lower case character "s", respectively. Consequently, a lower case symbol should be produced in the tape before the finger keys bearing these respective characters are actuated. The special finger key $C^5$, marked "L.C.," is therefore depressed to shift the bar S to the right and, through the conductor bars $C^{24}$, numbered 1—2—3—4—5, to energize the correspondingly numbered magnets $A^{33}$, which latter thereupon actuate the connected punch rods $A^5$ to produce in the tape the third symbol marked "L.C." in Fig. 19.

The finger keys bearing the respective characters "i" and "s" are now actuated successively, the depression of the key bearing the character "i" causing the punch magnets $A^{33}$, numbered 2—3, to be energized to produce the fourth symbol in the tape, and the depression of the key bearing character "s" causing the punch magnets, numbered 1—4, to be energized to produce the fifth symbol in the tape. For these characters, as in the case of the cap "H", indicators of the proper thickness are released from the magazine $B^1$ simultaneously with the punching of the respective symbols and composed in line in the assembler $B^6$.

The next element in the line is an expansible space-band, for which a sixth symbol is made in the tape by actuating the space key marked $C^3$. A spacer indicator $X^1$ (such as that shown at the right in Fig. 2) is released from the magazine at this time through the combination indicated in Fig. 19 and is composed in line with the indicators previously released. Indicators corresponding in thickness to the remaining matrices of the line are released successively from the magazine $B^1$ in their proper order, so that when the delivery slide finger $B^7$ is arrested in its movement toward the left, the composed line of indicators will have been completed and the proper number of symbols for composing a line of linotype matrices corresponding to the line shown, have been automatically produced in the tape.

It will be understood that the bar $C^{10}$ of the feed key $C^2$ does not make contact with the conductor bars $C^{24}$ when the key is actuated, but operates only the rocker plate $C^{14}$ to close the fourth circuit through the solenoid $A^{27}$, as before described, and as indicated by the diagram of Fig. 20. This arrangement is desirable, since it enables the tape to be fed through the perforating unit A while the punch magnets $A^{33}$ are inactive and to thus produce a space between certain symbols, which will provide for the time required to effect certain operations of a machine to be operated by the tape. While the solenoid $Q^3$ is also included in this circuit and will cause at such times an idle swinging of the bar Q, the slides controlled by the latter will remain locked by the bars R¹.

Figure 19:
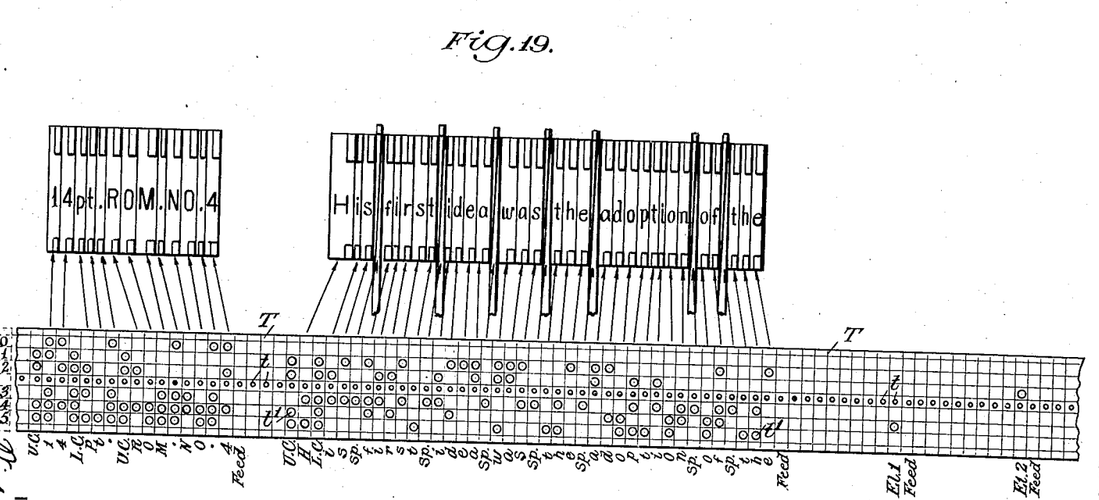
Fig. 19 is a diagrammatic view showing a perforated tape with two series of symbols representative of two successive lines of matrices and spacers to be composed by the tape, these composed lines being shown at the top with the individual matrices and spacers connected by leader lines to the corresponding symbols.

The two special keys, marked respectively the abbreviations "El. 1," and "El. 2", are intended to produce different symbols in the tape (as shown in Fig. 19) for the raising and lowering of the assembling elevator of the linotype machine to be controlled by the tape, and, like the shift keys C⁴, C⁵, are not connected to the power devices for actuating the escapements B² of the indicator magazine B¹.

It will now be seen that the present machine is well adapted to carry out the objects of the invention, functioning as it does to effect the composition of a line of the proper indicators as the symbols are produced in the tape. In the embodiment herein illustrated these operations are performed simultaneously by the use of selectively controlled electrical devices connecting the perforating and composing units with the common keyboard. These electrical devices are only given by way of illustration, as it is obvious that the controlling connections might be effected in some other way or by the use of some other form of mechanism, as for example, pneumatically operated mechanism instead of electrically operated mechanism. It should be understood therefore that the invention is not limited to any particular form or embodiment, except insofar as such limitations are specified in the claims.

Having thus described my invention, what I claim is:

1. A perforating machine including, in combination, a tape perforating mechanism for producing a series of symbols representative of a line of characters to be reproduced by the tape, a composing mechanism for setting up in line a series of typographical elements, a single keyboard, electrically operated coding means for selecting the typographical elements, other electrically operated coding means for selecting the perforators, and common circuits for operatively connecting the keyboard to both of said mechanisms; whereby the typographical elements are released for composition in line as the successive symbols are produced in the tape.

2. A perforating machine including, in combination, a tape perforating mechanism for producing a series of symbols representative of a line of characters to be reproduced by the tape, a keyboard, code devices acting in response to the actuation of the keyboard to control the operation of said perforating apparatus, a magazine containing a set of typographical elements, means controlling the release of said elements from the magazine, a series of power-operated reeds for actuating said releasing means, a series of intermediate locking bars movable to active or inactive position singly or in groups to establish different combinations in controlling the operation of the individual reeds, and means also controlled by the keyboard for operating said bars.

WILLIAM ACKERMAN.